(12) United States Patent
Lee et al.

(10) Patent No.: US 12,379,605 B2
(45) Date of Patent: Aug. 5, 2025

(54) OPTICAL DEVICE

(71) Applicants: LG ELECTRONICS INC., Seoul (KR); KOREA ADVANCED INSTITUTE OF SCIENCE AND TECHNOLOGY, Daejeon (KR)

(72) Inventors: Byounggoo Lee, Seoul (KR); Sangcheon Kim, Seoul (KR); Hyohoon Park, Daejeon (KR); Hyeonho Yoon, Daejeon (KR); Joonsup Shim, Daejeon (KR); Youngin Kim, Daejeon (KR)

(73) Assignee: LG ELECTRONICS INC., Seoul (KR)

( * ) Notice: Subject to any disclaimer, the term of this patent is extended or adjusted under 35 U.S.C. 154(b) by 327 days.

(21) Appl. No.: 17/796,534

(22) PCT Filed: Jan. 31, 2020

(86) PCT No.: PCT/KR2020/001496
§ 371 (c)(1),
(2) Date: Jul. 29, 2022

(87) PCT Pub. No.: WO2021/153828
PCT Pub. Date: Aug. 5, 2021

(65) Prior Publication Data
US 2023/0350216 A1    Nov. 2, 2023

(51) Int. Cl.
*G02B 27/09*    (2006.01)
*G02B 27/00*    (2006.01)

(52) U.S. Cl.
CPC ..... *G02B 27/0966* (2013.01); *G02B 27/0087* (2013.01)

(58) Field of Classification Search
CPC ............ G02B 27/0087; G02B 27/0966; G02B 27/123; G02B 27/10; G02B 3/06; G02B 3/00; G02B 26/06; G02B 26/08
See application file for complete search history.

(56) References Cited

U.S. PATENT DOCUMENTS

| | | | |
|---|---|---|---|
| 5,592,333 A * | 1/1997 | Lewis .................... | H01S 3/005 385/124 |
| 11,752,571 B1 * | 9/2023 | Magness ................ | H01S 5/005 219/121.76 |

(Continued)

FOREIGN PATENT DOCUMENTS

| | | | | |
|---|---|---|---|---|
| CN | 109143200 A | | 1/2019 | |
| DE | 69930441 T2 * | | 11/2006 | ........... H01Q 21/064 |

(Continued)

OTHER PUBLICATIONS

DE_102021212463_A1 (English Translation) (Year: 2023).*
DE_69930441_T2_M (English Translation) (Year: 2006).*
RU_2292612_C2 (English Translation) (Year: 2007).*

*Primary Examiner* — Tina Wong
*Assistant Examiner* — Mary A El-Shammaa
(74) *Attorney, Agent, or Firm* — Birch, Stewart, Kolasch & Birch, LLP

(57) ABSTRACT

An optical device can include an end-fire optical phased array including an optical splitter to split an optical signal into a plurality of channels, an optical phase controller to control a phase of the optical signal transmitted from the optical splitter, and an end-fire optical radiator to radiate the optical signal transmitted from the optical phase controller. A lens can be further positioned on a path of the radiated optical signal to control a vertical divergence angle of the radiated optical signal.

20 Claims, 11 Drawing Sheets

(56) References Cited

U.S. PATENT DOCUMENTS

| | | | |
|---|---|---|---|
| 2002/0181870 A1 | 12/2002 | Inoue et al. | |
| 2010/0183310 A1 | 7/2010 | Suzuki et al. | |
| 2014/0376001 A1 | 12/2014 | Swanson | |
| 2017/0131615 A1 | 5/2017 | Park et al. | |
| 2017/0268987 A1 | 9/2017 | Swanson | |
| 2018/0011490 A1 | 1/2018 | You et al. | |
| 2020/0259256 A1 | 8/2020 | Yu et al. | |
| 2022/0146903 A1* | 5/2022 | Watts | H04B 10/1123 |
| 2024/0345381 A1* | 10/2024 | Watts | G02F 1/3136 |

FOREIGN PATENT DOCUMENTS

| | | | | |
|---|---|---|---|---|
| DE | 102021212463 A1 * | 5/2023 | ........... | G01S 7/4817 |
| KR | 10-2017-0071395 A | 6/2017 | | |
| KR | 10-2018-0005988 A | 1/2018 | | |
| KR | 10-1924890 B1 | 12/2018 | | |
| KR | 10-2057199 B1 | 12/2019 | | |
| RU | 2292612 C2 * | 1/2007 | ............. | Y02B 60/50 |

\* cited by examiner (a)

(b)

(a)

(b)

(c)

(a)

(b)

(a)

(b)

OPTICAL DEVICE

CROSS REFERENCE TO RELATED APPLICATIONS

This application is the National Phase of PCT/KR2020/001496 filed on Jan. 31, 2020, which is hereby expressly incorporated by reference into the present application.

BACKGROUND OF THE DISCLOSURE

1. Field of the Disclosure

The present disclosure relates to an optical device that can control the steering of a beam radiated from an end-fire optical phased array, and more particularly, to an optical device that can reduce a horizontal divergence angle of the radiated beam.

2. Description of the Related Art

In order to detect the position or shape of a distant object, a Radio Detection and Ranging (RADAR) technology using electromagnetic waves has been used in various fields for a long time. Recently, by developing such a detection technology, more precise, faster, and a miniaturized Light Detection and Ranging (LiDAR) technology has been developed. The LiDAR technology, which uses light, is regarded as a key technology in next-generation major industries such as autonomous vehicle, wireless optical communication, and 3-D detection.

The LiDAR radiates a beam generated by the laser in a desired direction by using a steering device, and when the radiated beam is reflected by an object, detects the reflected light and measures a distance to the object. A typical LiDAR used a mechanical rotating device equipped with a mirror as a device for steering the beam. However, such a mechanical LiDAR has a problem in that it is difficult to miniaturize because of a mechanism for rotation or a mirror for reflection, it is vulnerable to deterioration in performance due to wear or vibration caused by mechanical motion, and power consumption is large. In order to solve this problem, an end-fire optical phased array that steers a beam by using the interference characteristics of light waves radiated from a plurality of radiator arrays without using a mechanical steering device has been researched and developed.

In the end-fire optical phased array, the horizontal radiation angle of the beam is determined by a phase difference of the light waves radiated from each optical radiator. At this time, the beam can be steered in the horizontal direction by adjusting the phase of each radiated light wave by an optical phased array At this time, according to the characteristic that the size of the horizontal viewing angle, which is the maximum steerable range, is inversely proportional to the array interval of an end-fire optical radiator, it becomes larger as the array interval is smaller than the wavelength. Accordingly, a maximum horizontal viewing angle can be obtained when it is half the wavelength.

However, when the array interval of the optical radiator is reduced to half a wavelength, there occurs an interference that the power of light is guided between optical waveguides is transmitted, and such an interference phenomenon causes deterioration of the performance of the steered radiation beam.

Therefore, in order to effectively widen the steering angle, a method capable of suppressing the optical interference phenomenon even in a structure in which the array of the optical radiator is half-wavelength is required.

In addition, since the optical radiator of the end-fire optical phased array uses the end of a single-mode optical waveguide formed in an integrated optical chip by end-fire as a radiator, and uses N-array, the thickness of the radiator is smaller than the wavelength, and the array width of the optical radiators may be greater than the wavelength.

As a result, the array of the end-fire optical radiator of the end-fire optical phased array can have a wide vertical radiation angle due to the optical radiator having a narrow thickness.

Such a wide vertical radiation angle impairs the resolution in the vertical direction, and causes a short detection distance due to a large beam diffusion

SUMMARY

The technical problem to be solved by the present disclosure will be described as follows.

First, the present disclosure provides an optical device capable of reducing the vertical divergence angle of a beam radiated from an end-fire optical phased array.

Second, the present disclosure provides an optical device capable of suppressing power interference while widening the horizontal viewing angle of a beam radiated from an end-fire optical phased array.

An optical device according to an embodiment of the present disclosure includes an end-fire optical phased array comprising an optical splitter configured to split an optical signal into a plurality of channels, an optical phase controller configured to control a phase of the optical signal transmitted from the optical splitter, and an end-fire optical radiator for radiating the optical signal transmitted from the optical phase controller; and a cylindrical lens which is positioned on a path of the radiated optical signal and controls a vertical divergence angle.

The cylindrical lens is a plano-convex lens.

The cylindrical lens comprises a convex surface corresponding to an incident surface, and a plane corresponding to a radiation surface.

The cylindrical lens comprises a plane corresponding to an incident surface, and a convex surface corresponding to a radiation surface.

An incident surface and a radiation surface of the cylindrical lens are convex.

The cylindrical lens comprises a radiation surface corresponding to a convex surface, and an incident surface corresponding to a concave surface having a smaller curvature than the radiation surface.

The cylindrical lens comprises a sectoral arc shape in a horizontal direction, an incident surface of the cylindrical lens is flat, and a radiation surface is a convex surface.

A distance from the end-fire optical radiator to the incident surface is uniform.

The cylindrical lens comprises a sectoral arc shape in a horizontal direction, and has a radiation surface corresponding to a flat surface and an incident surface corresponding to a convex surface.

A distance from the cylindrical lens to the end-fire optical radiator is greater than a focal length of the cylindrical lens.

The end-fire optical radiator includes a plurality of optical waveguides extending in a radial direction, wherein the plurality of optical waveguides have a different width.

Effects of the Disclosure

The optical device according to the embodiment of the present disclosure can have a wide horizontal viewing angle by reducing the radiation end of the end-fire optical radiator to half the size of the operating wavelength, and reduce the vertical divergence angle of the steered and radiated beam by disposing an optical lens in an appropriate position in a path of a beam radiated from the end-fire optical phased array.

In addition, according to an embodiment of the present disclosure, mutual interference between the optical waveguide arrays is sufficiently suppressed by varying the width of the optical waveguide included in the optical waveguide array for making the radiation end by being included in the end-fire optical phased radiation array.

In addition, according to an embodiment of the present disclosure, it is possible to provide a means to increase design and manufacturing efficiency while obtaining sufficient interference suppression effect, by bundling the included 16 optical waveguide channels into four adjacent channels, allocating different widths, and repeating this.

In addition, according to an embodiment of the present disclosure, in the beam that is steered and radiated in the horizontal direction from the end-fire optical phased array, the vertical divergence angle can be adjusted while the horizontal steering direction is maintained.

In addition, according to an embodiment of the present disclosure, in an application field for detecting an object by using a radiation beam by reducing the vertical divergence angle, it is possible to improve the vertical resolution, and also has the advantage of increasing the detection distance by reducing the beam diffusion.

DETAILED DESCRIPTION OF THE PREFERRED EMBODIMENTS

Figure 1:
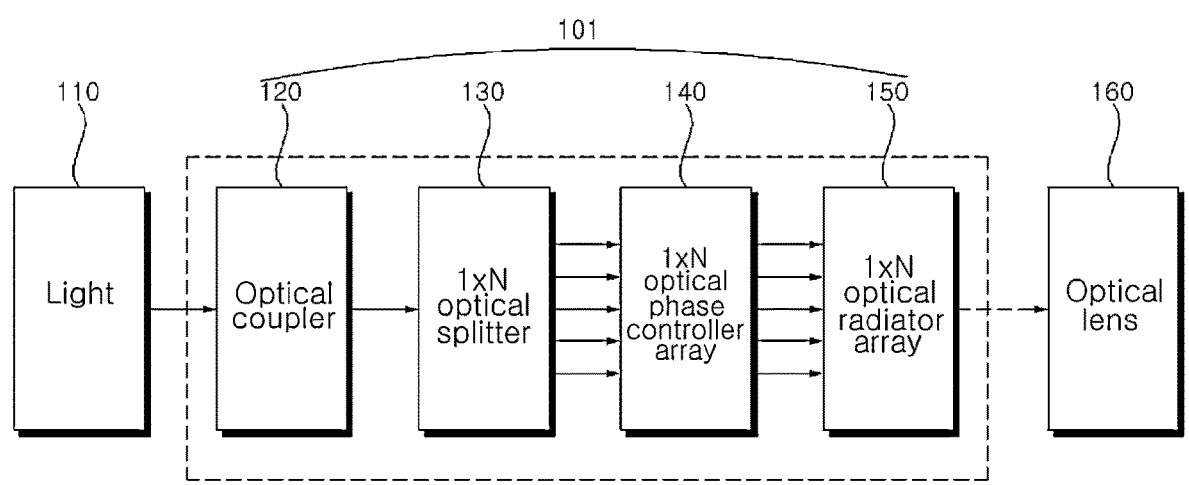
FIG. 1 shows a configuration relationship of an optical device according to an embodiment of the present disclosure.

Hereinafter, embodiments according to the present disclosure will be described in detail with reference to the accompanying drawings. However, the present disclosure is not limited to the embodiments. In addition, like reference numerals in each drawing denote like members.

In addition, the terminologies used in this specification are terms used to properly express a preferred embodiment of the present disclosure, and may vary depending on the intention of a viewer or operator or customs in a field to which the present disclosure belongs. Accordingly, definition of these terminologies should be made based on the content throughout this specification.

FIG. 1 shows a configuration of an optical device 100 according to an embodiment of the present disclosure, and shows a configuration relationship between an end-fire optical phased array 101 having a wide horizontal viewing angle and an optical lens 160 capable of adjusting a vertical divergence angle thereof.

First, the configuration of the optical device 100 according to an embodiment of the present disclosure will be outlined with reference to FIG. 1.

The optical device 100 may include a light source 110, an optical phased array 101, and a lens 160.

Specifically, the light source 110 may include a laser or LED, and may be implemented on an integrated optical chip including a low refractive index upper and lower clad layer and a high refractive index waveguide layer.

The light source 110 may be composed of an independent optical module that transmits an optical signal through an optical fiber. In this case, the optical signal may be connected to an optical waveguide on a chip through the optical coupler 120.

However, the type, configuration, and structure of the light source 110 are not limited to the content disclosed in the above description and drawing, and may include a range that can be easily design-changed by a person skilled in the art.

The optical coupler 120 may connect a single-mode optical signal transmitted from the light source 110 through the fiber to the optical waveguide implemented on a chip.

The optical coupler 120 may be implemented as a grating coupler that connects an optical signal by using diffraction of light by varying the refractive index at regular intervals according to an embodiment. In another embodiment, it may be implemented as an edge coupler for connecting a single-mode optical fiber to the edge of a waveguide implemented on a chip.

In addition, the optical coupler 120 may be omitted, and in this case, the light source 110 may connect the optical signal transmitted without the optical coupler 120 to the 1×N optical splitter 130 through the optical waveguide.

The 1×N optical splitter 130 may split an optical signal transmitted from the optical coupler 120 on a scale of N channels to transmit the optical signal to a 1×N optical phase controller 140.

The 1×N optical phase controller 140 may adjust the phase of the optical signal, which is splitted into N channels and transmitted, for each channel, and by using the function, may apply a sequential phase difference to each channel.

A 1×N optical radiator 150 may radiate the optical signal transmitted to each channel through the phase controller 140 into a free space to form a beam in the free space due to the interference effect by N channels.

The lens 160 may adjust the vertical divergence angle while maintaining the horizontal steering angle of the beam radiated from the end-fire optical radiator 150.

However, the array structure and inclusion relationship of the components included in the optical device 100 are not limited to the above description and drawing, and may be incorporated into or separated from the component.

For example, at least one of the light source 110 and the lens 160 may be included in the optical phased array 101, or the optical device 100 may include the optical phased array 101 and the lens 106 while excluding the light source 110.

Next, with reference to FIGS. 2 to 4, the operation content and principle of a component included in the optical device 100 will be described in detail.

Figure 2:
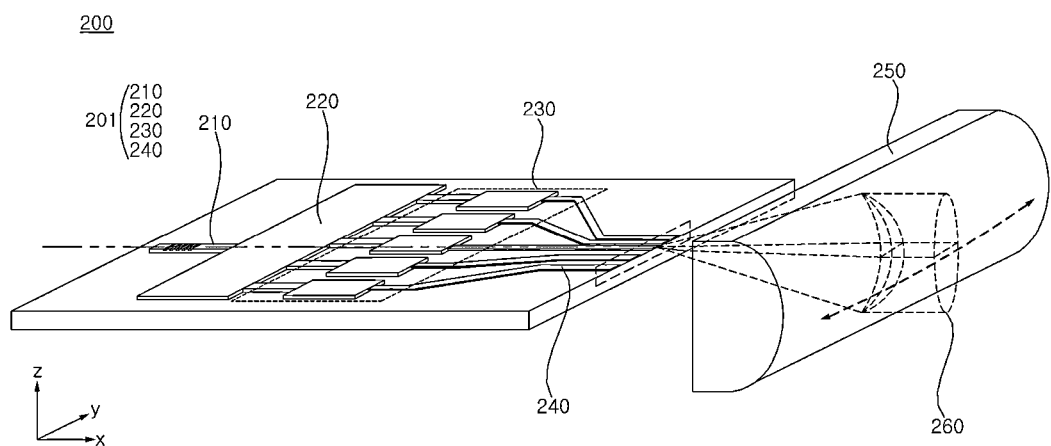
FIG. 2 is a perspective view of an optical device according to an embodiment of the present disclosure.

FIG. 2 is a perspective view of an optical device 200 according to an embodiment of the present disclosure, and shows, for convenience, that the number N of channels are five.

The optical device 200 according to an embodiment of the present disclosure includes an optical phased array 201 and a lens 250, and the optical phased array 201 may include an optical coupler 210 implemented in a silicon integrated optical chip, a 1×5 optical splitter 220, a 1×5 optical phase controller 230, and a 1×5 optical radiator 240, and the lens 250 may be cylindrical.

Specifically, in order to couple the externally generated laser beam to the silicon optical waveguide of the silicon integrated optical chip, the optical coupler 210 may create a grid formed to have a certain cycle and depth that satisfy a Bragg condition according to the wavelength and the incidence angle in the silicon optical waveguide, and may couple a beam to the silicon optical waveguide by using diffraction by the grid at a designed incident angle.

The 1×5 optical splitter 220 may split the single-mode optical signal on the waveguide coupled by the optical coupler 210 to the N-channel scale of constructive interference conditions by using multimode interference, and may transmit to the 1×5 optical phase controller 150.

The 1×5 optical phase controller 230 provides a means for adjusting the phase difference between channels by adjusting the phase of the optical signal transmitted from the 1×5 optical splitter 220 for each channel.

In an embodiment, a rib-type optical waveguide is formed on a silicon integrated optical chip, p or n-type doping is used in a slab area, electricity is applied thereto, and the phase of the waveguided optical signal may be varied by adjusting the effective refractive index of the optical waveguide, by using an electro-optic effect or a thermo-optic effect.

The 1×5 end-fire optical radiator 240 is made by exposing a silicon optical waveguide end having N square ends spaced by half the wavelength to free space.

For example, when a wavelength of 1550 nm is used, the arrayed optical radiators 240 may have an interval of 775 nm. In this case, in order to suppress an interference phenomenon in which the power transmitted to the optical waveguide is propagated to the adjacent optical waveguide, the width of the adjacent waveguide may be designed differently.

Referring again to FIG. 3, the optical waveguide 240a may be formed of silicon Si having a high refractive index through which light guides, and a silica cladding having a low refractive index.

Figure 3:
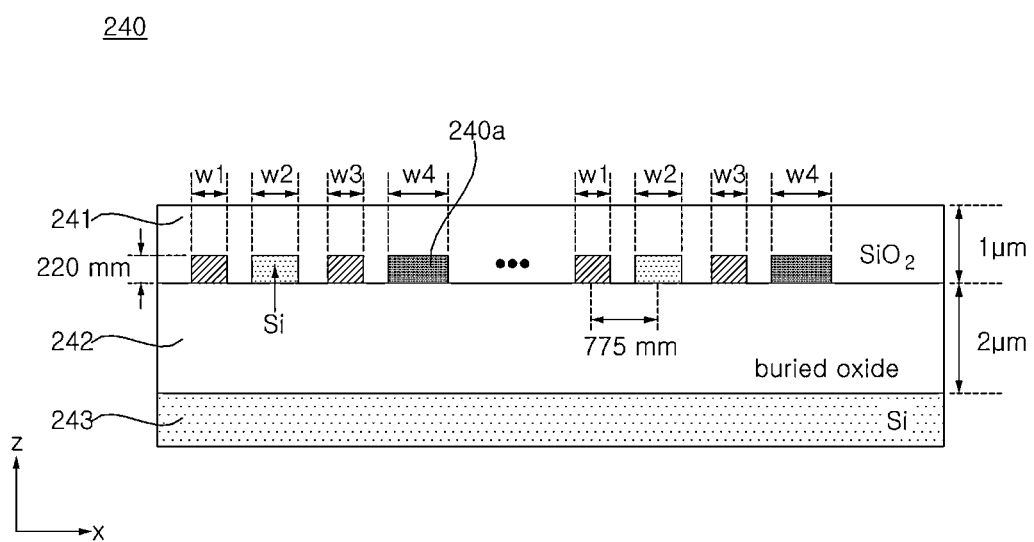
FIG. 3 is a cross-sectional view illustrating an array structure of an end-fire optical radiator that can be implemented on a chip in an optical device according to an embodiment of the present disclosure.

The N optical waveguides 240a have a structure in which w1, w2, w3, and w4 are repeated as shown in FIG. 3, in a case where the thickness is 220 nm, the interval of the optical waveguides 240a is 775 nm, N is 16, and the width is 350, 420, 385, and 455 nm, the overall width becomes 12 μm.

In the adjacent optical waveguide 240a, power interference between the optical waveguides 240a can be suppressed, by varying the width.

In addition, in a proposed structure, since the interval between the optical waveguides 240a is 775 nm and the used wavelength is 1550 nm, the theoretical viewing angle is 180°.

However, as a specific value shown in FIG. 3, the interval, thickness, and overall width between the optical waveguides 240a show an example according to an embodiment of the present disclosure, and may be different.

That is, the optical device 100 according to an embodiment of the present disclosure can implement a wide horizontal viewing angle by controlling the width of the optical waveguide 240a of the optical radiator 240 differently and, at the same time, suppress power interference that may occur.

Figure 4:
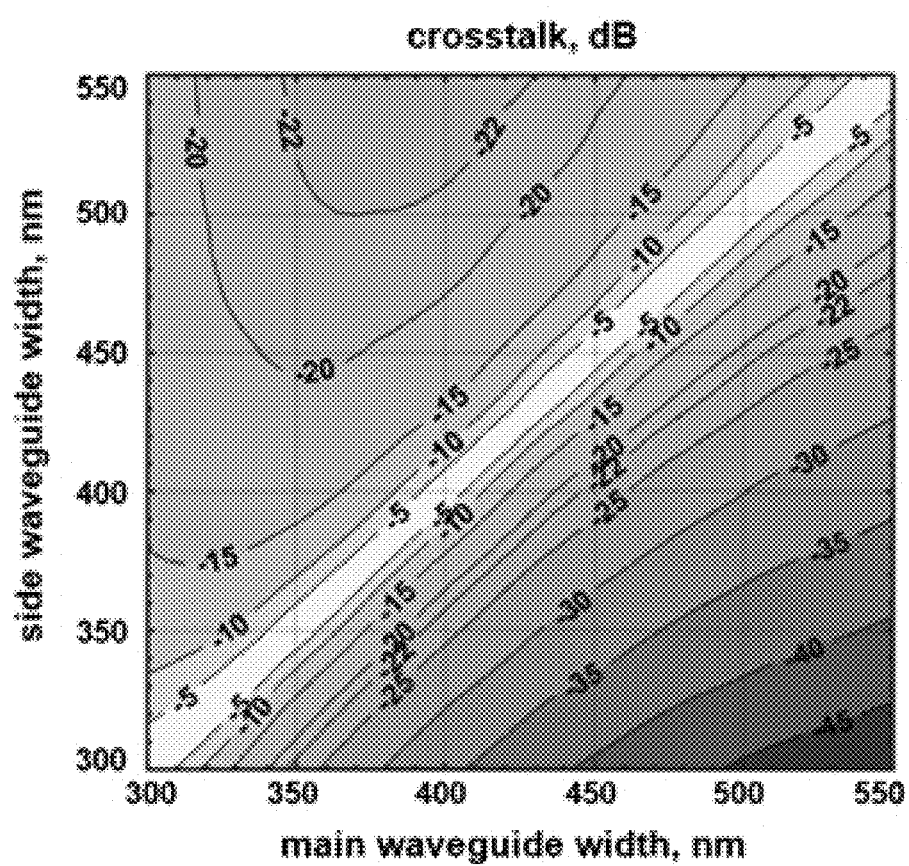
FIG. 4 shows an interference amount according to a difference in width between optical waveguides when an array interval is equal to a half-wavelength length.

In addition, FIG. 4 shows the amount of interference according to the difference in width between waveguides when the array interval is equal to the half-wavelength length and, for example, when light of a wavelength of 1550 nm is guided to the optical waveguide 240a at an interval of 775 nm, shows the ratio of optical power transmitted between the optical waveguides 240a.

A horizontal axis indicates the width of an original optical waveguide 240a to which an original signal is applied, and a vertical axis indicates the width of the adjacent optical waveguide 240a.

The value marked on a map indicates a ratio of a power transmitted to the adjacent optical waveguide 240a due to the interference phenomenon to the power of the original signal.

It can be seen that when the width of the original optical waveguide 240a is identical with the width of the adjacent optical waveguide 240a, it is transmitted at a level of −5 dB, and decreases as the difference increases. The optical waveguide width 240a selected in the above embodiment is selected in consideration of these conditions, and other combination can be selected.

Next, the configuration and effect of the lens 250 will be described in detail with reference to FIGS. 2 and 5 to 8.

The lens 250 is an optical lens positioned in the traveling direction of a beam formed in the free space, and may perform a function of adjusting the vertical divergence angle of the beam.

Specifically, the lens 250 may be a cylindrical lens, and change the form of the radiated beam while passing a Farfileld pattern 260 that is radiated by the 1×N end fire optical radiator 240 and formed in a space.

For example, the end of the cylindrical lens 250 may have a cylindrical end and a quadrangular end in two perpendicular directions.

Specifically, the end of a plane including the x and z axes may be a cylindrical end, and a beam incident to the cylindrical end may be focused as a collimated beam.

Meanwhile, the end of a plane including the x and y axes may have a quadrangular end, and the beam incident to the quadrangular end passes in the same direction as the incident direction.

Using these characteristics, according to the optical device 200 according to an embodiment of the present disclosure, in the steered divergent beam 260 radiated from the end-fire optical radiator 240, the vertical divergence angle can be reduced or collimated by using a cylindrical end while the steering angle is maintained as a square end.

Figure 5:
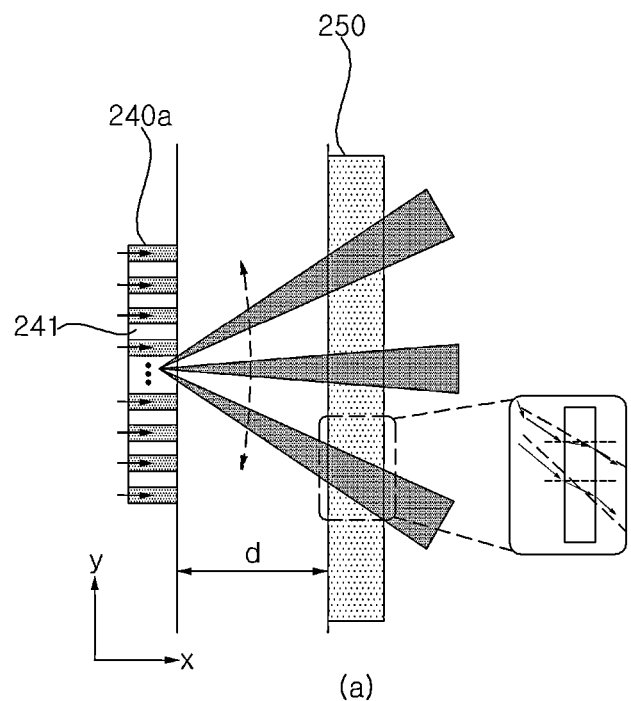
FIG. 5 is a conceptual diagram for the array of an end-fire optical radiator and a lens, in an optical device according to an embodiment of the present disclosure.
Figure 5:
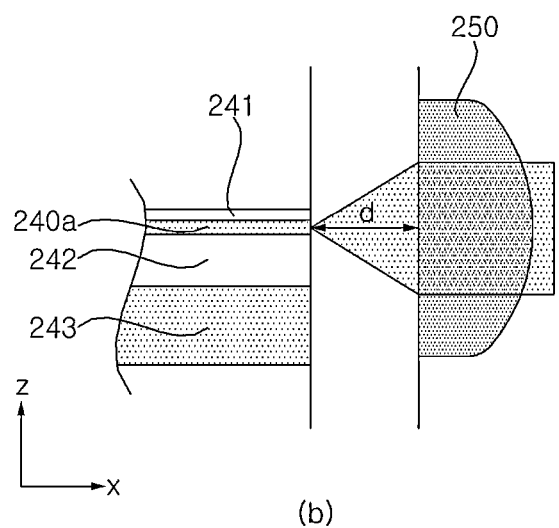

FIG. 5 is a schematic diagram of the structure and disposition of the end-fire optical radiator 240 having a wide horizontal steering angle and the cylindrical lens 250 for adjusting the vertical divergence angle of the beam radiated from the end-fire optical radiator 240, in an optical device according to an embodiment of the present disclosure.

FIG. 5A is a plan view of the disposition structure of the end-fire optical radiator 240 and the cylindrical lens 250, and FIG. 5B is a cross-sectional view of the disposition structure of the end-fire optical radiator 240 and the cylindrical lens 250.

The silicon-based end-fire optical radiator 240 may be formed by setting a silicon Si layer 240a of high refractive index on a silicon oxide SiO2 layer 242 buried in a silicon-on-insulator (SOI) substrate 243 as a core, and cladding the buried silicon oxide and the silicon oxide SiO2 241 deposited on an upper surface.

As shown in FIG. 5A showing a plan view of the above described elements, the end-fire optical radiator 240 is generally composed of a plurality of silicon optical waveguides 240a in an array, so that the width of the optical radiator 240 is several tens to hundreds of the optical waveguides 240a.

For example, when configured as in an embodiment of the present disclosure, the size of the silicon-based end-fire optical radiator 240 has a size of 12 mm that is 54 times larger than the thickness of 220 nm of the silicon core.

According to the diffraction theory of optics, since the divergence angle is inversely proportional to the size of the radiator, the vertical divergence angle has a divergence angle 54 times greater than the horizontal divergence angle.

Meanwhile, in FIG. 5B, the cylindrical lens 250 disposed in a distance d from the silicon-based end-fire optical radiator 240 may reduce the divergence angle of a beam that diverges vertically by using a plano-convex lens, which is a vertical end of a cylindrical lens, or may pass the beam by collimation.

That is, in the optical device 200 according to an embodiment of the present disclosure, the cylindrical lens 250 is positioned (a convex surface becomes an incident surface, and a plane is a radiation surface) in the traveling direction of the beam, thereby effectively reducing the vertical divergence angle while not distorting the horizontal viewing angle of the beam.

As a result, the vertical divergence angle is reduced, so that the straightness of the beam can be increased and the focusing ability can be improved. Furthermore, as the focusing of the beam is improved, the used power can be reduced and the data transmission efficiency can be significantly improved.

Meanwhile, the optical device 200 according to the embodiment of the present disclosure can reduce the vertical divergence angle more effectively by controlling a distance d between the optical radiator 240 and the lens 250 and a focal point f of the cylindrical lens 250 having a plano-convex lens end.

Figure 6:
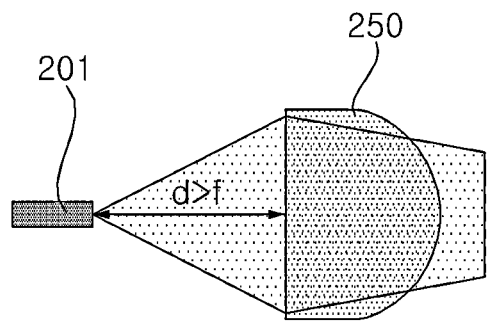
FIG. 6 is a conceptual diagram illustrating the radiation angle of a beam according to the disposition of an end-fire optical radiator and a cylindrical lens in an optical device according to an embodiment of the present disclosure.
Figure 6:
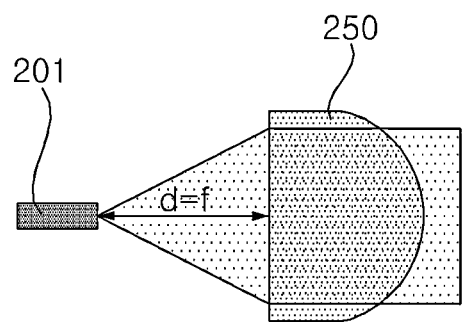
Figure 6:
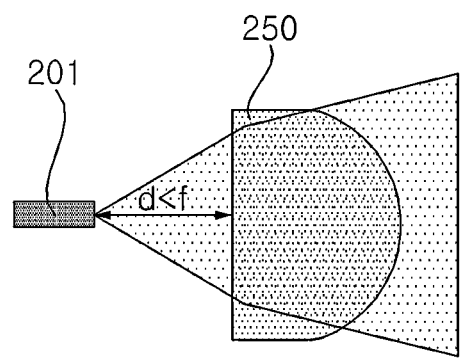

FIG. 6 is a view to explain the divergence angle, position, and relationship of a beam passing through the lens according to the array of the end-fire optical radiator 240 and the cylindrical lens 250 in the optical device 200 according to an embodiment of the present disclosure.

Specifically, FIG. 6A is a case in which the beam radiation position of the end-fire optical radiator 240 is disposed farther than the focal point of the cylindrical lens 250.

FIG. 6B is a case in which the beam radiation position of the end-fire optical radiator 240 is located in the focal point of the cylindrical lens 250.

FIG. 6C is a case in which the beam radiation position of the end-fire optical radiator 240 is disposed close to the focal point of the cylindrical lens 250.

The optical device 100 according to an embodiment of the present disclosure may have the smallest beam divergence angle, when the end-fire optical radiator 240 is positioned in the focal point of the cylindrical lens 250 as shown in FIG. 6B.

Meanwhile, when the position of the end-fire optical radiator 240 is smaller or larger than the focal length, the beam divergence angle may be increased as shown in FIGS. 6A and 6C.

Therefore, according to an embodiment of the present disclosure, the optical device 200 can converge, collimate, and diverge a beam by adjusting the position of the end-fire optical radiator 240, and for example, can reduce the vertical divergence angle of a beam by implementing a converged beam.

Using this characteristic, if the position of the end-fire optical radiator array is appropriately adjusted, the divergence angle of the beam passing through the cylindrical lens can be adjusted.

This can also be confirmed through specific experimental results.

Figure 7:
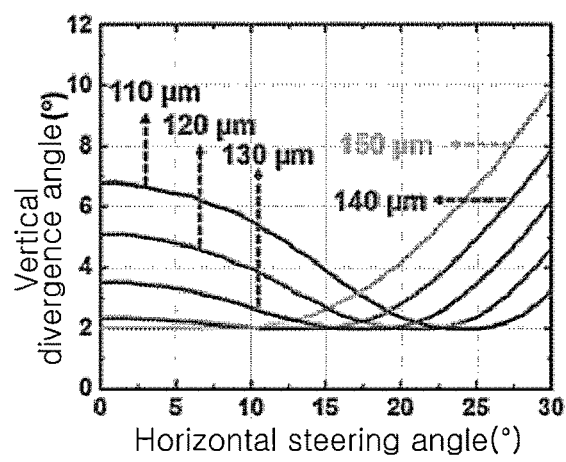
FIG. 7 shows a change in the radiation angle according to a position of an end-fire optical radiator and a lens in an optical device according to an embodiment of the present disclosure.
Figure 7:
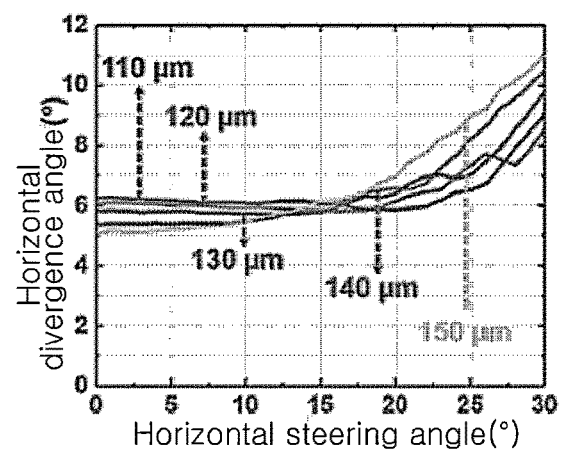

FIG. 7 shows a change in vertical and horizontal radiation angles according to the position of the end-fire optical radiator 240 and the cylindrical lens 250.

FIG. 7A shows the change of the vertical radiation angle, and FIG. 7B shows the change of the horizontal radiation angle.

Specifically, referring to FIG. 7A, when the end-fire optical radiator 240 is positioned at 150 mm which is the focal position f of the cylindrical lens 250, the vertical divergence angle increases as the horizontal steering angle increases. Thus, the vertical divergence angle is 10° when the horizontal steering angle is 30°.

In addition, it can be seen that as the position of the end-fire optical radiator 240 becomes closer to the focal position f, the vertical divergence angle becomes smaller at the horizontal steering angle 30°.

Considering that the cylindrical lens 250 is symmetrical left and right, the maximum value of the vertical divergence angle gradually decreases from 8° at 140 mm to 6° at 130 mm in the range of +/−30°.

When the distance between the end-fire optical radiator 240 and the cylindrical lens 250 is reduced to 120 mm or less, the divergence angle increases at a horizontal steering angle of 0°, and the maximum divergence angle increases. Therefore, it can be confirmed that the position of the end-fire optical radiator 240 that minimizes the divergence angle exists between 120 mm and 130 mm.

FIG. 7B shows the change in the horizontal divergence angle according to the position of the end-fire optical radiator 240. When the end-fire optical radiator 240 is located at 150 mm, which is a focal point, the horizontal divergent angle increases as the horizontal steering angle increases. In the case of a horizontal steering angle of 30°, in the steering range +/−30°, the maximum horizontal divergence angle became 11°.

Since the cylindrical lens 250 is symmetrical, it shows a horizontal divergence angle of 11°, which is the maximum value, even at −30°.

When the distance between the end-fire optical radiator 240 and the cylindrical lens 250 is reduced, it can be seen that the horizontal divergence angle measured at a horizontal steering angle of 30° becomes smaller, and the maximum horizontal divergence angle within the +/−30° steering range is gradually decreased from 10.5° at 140 mm, 9.5° at 130 mm, to 8.5° at 120 mm.

Accordingly, in the optical device 200 according to an embodiment of the present disclosure may determine the maximum vertical divergence angle and the maximum horizontal angle within the horizontal steering range, by determining the distance between the end-fire optical radiator 240 and the cylindrical lens 250 as an appropriate value.

For example, if the distance between the end-fire optical radiator 240 and the cylindrical lens 250 is determined as a value of 120 mm to 130 mm, the maximum vertical divergence angle can be adjusted from 95.6° to 6.7°, and the maximum horizontal divergence angle can be adjusted from 7.6° to 10°.

Next, optical devices 300, 400, 500, and 600 according to another embodiment of the present disclosure will be described with reference to FIGS. 8 to 10.

The optical devices 300, 400, 500, and 600 described below are similar to the above described optical device 200, except that the shape of the lens 350, 450, 550 and 650 is different.

Accordingly, the description of the above-described optical device 200 can be directly applied to the description of the other components.

Figure 8:
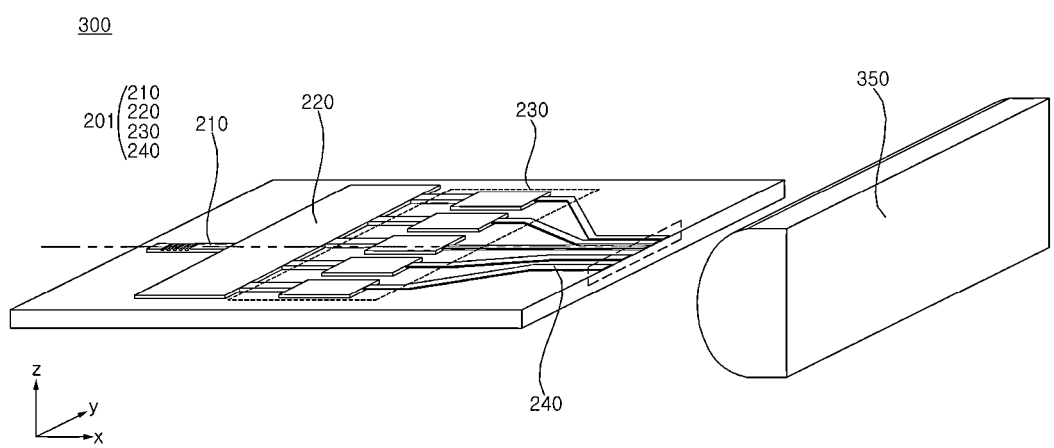
FIG. 8 is a perspective view of an optical device according to another embodiment of the present disclosure.

Referring to FIG. 8, in the optical device 300 according to another embodiment of the present disclosure may have a shape in which the optical lens 250 of FIG. 2 is plane-symmetrical to a plane including the z-y axis, in comparison with the optical device 200 of FIG. 2.

Specifically, the lens 350 may be a cylindrical lens 350 having a surface forming a curved surface and a flat surface opposite to the curved surface.

The optical device 300 according to another embodiment of the present disclosure also has a curved surface formed on the lens 350 in the vertical direction to reduce the vertical divergence angle, and does not distort the viewing angle, as the end of the lens 350 in the horizontal direction is a rectangle.

Figure 9:
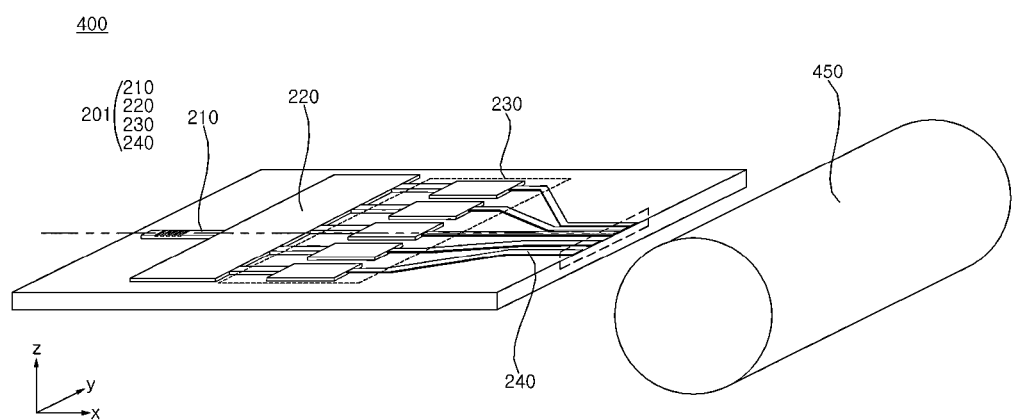
FIG. 9 is a perspective view of an optical device according to another embodiment of the present disclosure.

Referring to FIG. 9, in the optical device 400 according to another embodiment of the present disclosure, an optical lens 450 has both surfaces (a surface on which the beam is incident and a surface through which the beam is radiated by passing through the lens) that form a curved surface, in comparison with the optical device 200 of FIG. 2.

Specifically, the lens 450 may have a surface on which the beam is incident and a surface through which the beam is radiated by passing through the lens to form a curved surface in a vertical direction on both surfaces. The optical device 400 according to another embodiment of the present disclosure also has a curved surface formed on the lens 450 in the vertical direction, and does not distort the viewing angle in the horizontal direction, as the end of the lens 450 in the horizontal direction is rectangular.

Figure 10:
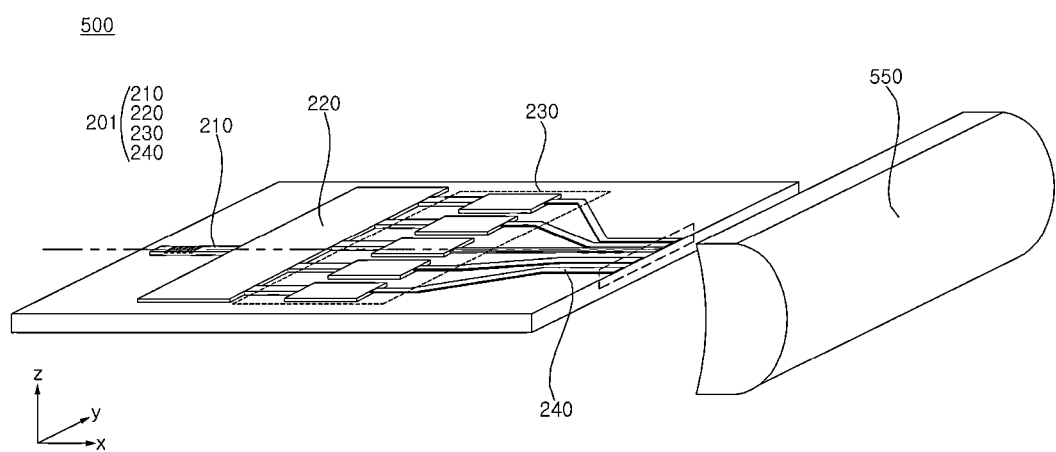
FIG. 10 is a perspective view of an optical device according to another embodiment of the present disclosure.

Referring to FIG. 10, in the optical device 500 according to another embodiment of the present disclosure, a lens 550 has both surfaces (a surface on which the beam is incident and a surface through which the beam is radiated by passing through the lens) that form a curved surface, in comparison with the optical device 200 of FIG. 2.

In addition, compared to the optical device 400 of FIG. 9, the incident surface of the lens 550 may form a concave curved surface.

Specifically, the lens 550 may have a surface on which the beam is incident and a surface through which the beam is radiated by passing through the lens to form a curved surface in a vertical direction on both surfaces, and the incident surface may be a concave surface concave in the radial direction of the beam.

Furthermore, the curvature of the concave surface may be smaller than the curvature of the radiation surface. The optical device 500 according to another embodiment of the present disclosure also has a curved surface formed on the lens 550 in the vertical direction to reduce the vertical divergence angle, and does not distort the viewing angle in the horizontal direction, as the end of the lens 550 in the horizontal direction is rectangular.

Figure 11:
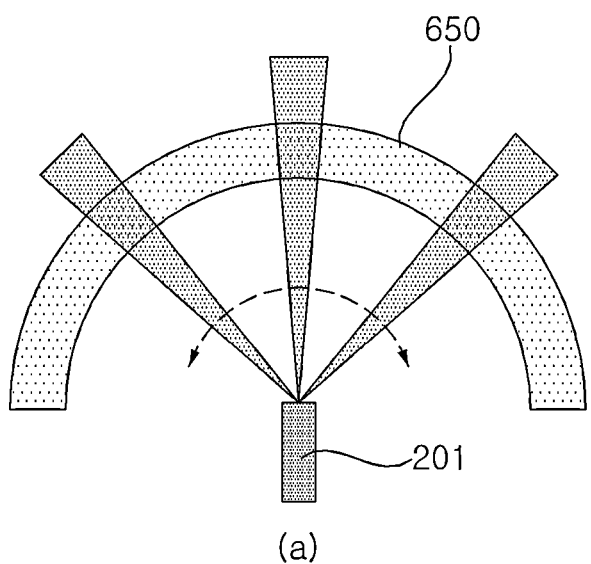
FIG. 11 is a plan view and a cross-sectional view of an optical device according to another embodiment of the present disclosure.
Figure 11:
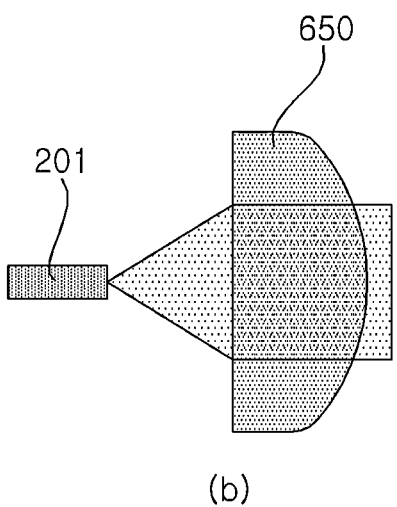

Referring to FIG. 11, as another embodiment of the present disclosure, the optical device 600 may include a curved cylindrical lens 650.

FIG. 1A is a plan view of an embodiment to which the curved cylindrical lens 650 is applied, and FIG. 11B is a cross-sectional view of an embodiment to which the curved cylindrical lens 650 is applied.

The curved cylindrical lens 650 may have a sectoral arc shape in a horizontal direction, and may be a plano-convex lens in a vertical direction in end. Furthermore, the incident surface may be flat and the radiation surface may be convex.

However, the incident surface may be convex and the radiation surface may be flat.

When the curved cylindrical lens 650 according to the present embodiment is applied, a constant distance can be maintained with the end-fire optical radiator 240 of the end-fire optical phased array 201 irrespective of beam steering. Accordingly, there is an advantage in that the divergence angle of the beam can be kept constant.

As described above, although the embodiments have been described with reference to the restricted embodiments and drawings, various modifications and variations are possible from the above description by those skilled in the art. For example, the described techniques may be performed in an order different from the described method, and/or the described components of the system, structure, apparatus, circuit, and the like may be coupled or combined in a different form from the described method, or substituted or replaced by other components or equivalents to achieve an appropriate result.

What is claimed is:

1. An optical device comprising:
    an end-fire optical phased array comprising an optical splitter configured to split an optical signal into a plurality of channels, an optical phase controller configured to control a phase of the optical signal transmitted from the optical splitter, and an end-fire optical radiator configured to radiate the optical signal transmitted from the optical phase controller; and
    a lens positioned on a path of the radiated optical signal and configured to control a vertical divergence angle of the radiated optical signal,
    wherein the end-fire optical radiator comprises a plurality of optical channel waveguides extending in a radial direction,
    wherein the plurality of optical channel waveguides have different widths, and
    wherein the plurality of optical channel waveguides are arranged repeatedly, and widths of adjacent optical channel waveguides among the plurality of optical channel waveguides are different from each other.

2. The optical device of claim 1, wherein the lens is a plano-convex lens.

3. The optical device of claim 2, wherein the lens comprises a convex surface corresponding to an incident surface, and a plane corresponding to a radiation surface.

4. The optical device of claim 2, wherein the lens comprises a plane corresponding to an incident surface, and a convex surface corresponding to a radiation surface.

5. The optical device of claim 1, wherein an incident surface and a radiation surface of the lens are convex.

6. The optical device of claim 1, wherein the lens comprises a radiation surface corresponding to a convex surface, and an incident surface corresponding to a concave surface having a smaller curvature than the radiation surface.

7. The optical device of claim 1, wherein the lens comprises a sectoral arc shape in a horizontal direction, an incident surface of the lens is flat, and a radiation surface is a convex surface.

8. The optical device of claim 7, wherein a distance from the end-fire optical radiator to the incident surface of the lens is uniform.

9. The optical device of claim 1, wherein the lens comprises a sectoral arc shape in a horizontal direction, and has a radiation surface that is flat and an incident surface that is convex.

10. The optical device of claim 1, wherein a distance from the lens to the end-fire optical radiator is greater than a focal length of the lens.

11. The optical device of claim 1, wherein the different widths of the plurality of optical waveguides extend in a direction perpendicular to the radial direction.

12. The optical device of claim 11, wherein an arrangement of the plurality of optical waveguides are repeated in order in the direction perpendicular to the radial direction.

13. The optical device of claim 12, wherein the plurality of optical waveguides that are repeated in order have widths of about 350 nm, about 420 nm, about 385 nm and about 455 nm in repeating order.

14. The optical device of claim 1, wherein an interval between the plurality of optical waveguides is about 775 nm.

15. The optical device of claim 1, wherein the optical signal has a wavelength of about 1550 nm.

16. The optical device of claim 1, wherein a thickness of the plurality of optical waveguides is about 220 nm.

17. The optical device of claim 1, wherein the lens is cylindrical.

18. An optical device comprising:
   an end-fire optical phased array including an end-fire optical radiator configured to radiate an optical signal; and
   a lens positioned on a path of the radiated optical signal and configured to control a vertical divergence angle of the radiated optical signal,
   wherein the end-fire optical radiator comprises a plurality of optical waveguides arranged in a direction intersecting a radiation direction of the optical signal,
   wherein the plurality of optical waveguides have the same thickness and different widths, and
   wherein the plurality of optical channel waveguides are arranged repeatedly, and widths of adjacent optical channel waveguides among the plurality of optical channel waveguides are different from each other.

19. The optical device of claim 18, wherein the end-fire optical phased array further includes:
   an optical splitter configured to split the optical signal into a plurality of channels; and
   an optical phase controller configured to control a phase of the optical signal transmitted from the optical splitter,
   wherein the plurality of optical waveguides are spaced by half a wavelength of the optical signal.

20. The optical device of claim 18, wherein, in each repeat arrangement of the plurality of optical channel waveguides, a sequence of the plurality of optical channel waveguides is the same.

* * * * *